United States Patent
Rouet et al.

(10) Patent No.: US 9,721,381 B2
(45) Date of Patent: Aug. 1, 2017

(54) SYSTEM, METHOD, AND COMPUTER PROGRAM PRODUCT FOR DISCARDING PIXEL SAMPLES

(71) Applicant: NVIDIA Corporation, Santa Clara, CA (US)

(72) Inventors: Christian Jean Rouet, San Francisco, CA (US); Manan Maheshkumar Patel, San Jose, CA (US); Shirish Gadre, Fremont, CA (US); Daniel Paul Wilde, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 237 days.

(21) Appl. No.: 14/052,644

(22) Filed: Oct. 11, 2013

(65) Prior Publication Data

US 2015/0103087 A1    Apr. 16, 2015

(51) Int. Cl.
*G06T 1/20* (2006.01)
*G06T 15/80* (2011.01)
*G06T 15/00* (2011.01)

(52) U.S. Cl.
CPC ............ *G06T 15/80* (2013.01); *G06T 15/005* (2013.01); *G06T 1/20* (2013.01)

(58) Field of Classification Search
None
See application file for complete search history.

(56) References Cited

U.S. PATENT DOCUMENTS

| | | | |
|---|---|---|---|
| 8,228,328 B1 * | 7/2012 | French et al. | 345/421 |
| 2004/0036692 A1 * | 2/2004 | Alcorn et al. | 345/582 |
| 2007/0268289 A1 * | 11/2007 | Yu et al. | 345/422 |
| 2008/0117221 A1 * | 5/2008 | Hutchins et al. | 345/506 |
| 2009/0195552 A1 * | 8/2009 | Nystad | G06T 11/40 345/611 |
| 2013/0063440 A1 * | 3/2013 | Son | G06T 15/005 345/426 |
| 2013/0249927 A1 * | 9/2013 | Brennan | G06T 15/503 345/589 |
| 2014/0168220 A1 * | 6/2014 | Nystad | G06T 1/20 345/421 |

OTHER PUBLICATIONS

Wikibooks, "GLSL Programming Unity Gutaways", Jan. 3, 2012.*
Ryg, "A trip through the Graphics Pipeline 2011, part 5", Jul. 5, 2011, fgiesen.wordpress.com.*

* cited by examiner

*Primary Examiner* — Mark Zimmerman
*Assistant Examiner* — Yu-Jang Tswei
(74) *Attorney, Agent, or Firm* — Zilka-Kotab, PC (57) ABSTRACT

A system, method, and computer program product are provided for discarding pixel samples. The method includes the steps of completing shading operations for a pixel set including one or more pixels to generate per-sample shaded attributes according to a shader program executed by a processing pipeline. Discard information for the pixel set is evaluated and one or more per-sample shaded attributes for at least one pixel in the pixel set are discarded based on the evaluated discard information.

20 Claims, 8 Drawing Sheets

(1xAA)

*Fig. 6A*

(2xAA)

*Fig. 6B*

(4xAA)

*Fig. 6C*

(8xAA)

*Fig. 6D*

(8xAA)

SYSTEM, METHOD, AND COMPUTER PROGRAM PRODUCT FOR DISCARDING PIXEL SAMPLES

FIELD OF THE INVENTION

The present invention relates to graphics processing, and more particularly to discarding pixel samples.

BACKGROUND

During rasterization of graphics primitives, rasterized coverage information is produced that indicates which pixels are covered by each of the graphics primitives. When multi-sampling or anti-aliasing is used, each pixel includes multiple sample locations and the coverage information indicates which of the sample locations are covered. The covered pixels are then processed to generate a final color value for each of the pixels of an image.

Modern graphics processors typically perform early z-testing to avoid processing pixels for a graphics primitive that is behind, and therefore, occluded by another graphics primitive. Early z-testing is performed before shading operations, to avoid the expense of performing shading operations that will not contribute to the final color values of pixels in the image. The shading operations produce shaded fragments representing color data for the graphics primitives that cover at least one sample of a pixel and survived the early z testing. After the shading operations, comprehensive z-testing may be performed to remove shaded fragments that are occluded and therefore not visible in the image, so that color data for the non-visible shaded fragments are not written to a pixel of the image.

As the result of shading operations, some shaded fragments may not contribute to the final color of a pixel. It is desirable to avoid further processing of the non-contributing shaded fragments. Thus, there is a need for addressing this issue and/or other issues associated with the prior art.

SUMMARY

A system, method, and computer program product are provided for discarding pixel samples. The method includes the steps of completing shading operations for a pixel set including one or more pixels according to a shader program executed by a processing pipeline to generate per-sample shaded attributes. Discard information for the pixel set is evaluated and one or more per-sample shaded attributes for at least one pixel in the pixel set are discarded based on the evaluated discard information.

DETAILED DESCRIPTION

Shading operations may be performed that modify the rasterized coverage information or otherwise indicate that a shaded fragment will not contribute to the final color of a pixel. While the shaded fragments that do not contribute to the final color of a pixel are not written to a frame buffer that stores the color data for an image, the shaded fragments are passed through pipeline stages downstream of a fragment shading stage in a processing pipeline. The shaded fragments may also be transmitted across one or more communication paths between downstream processing stages. The transmission and pipeline storage of shaded fragments that do not contribute to the final color of a pixel consumes power and may also reduce processing performance. Shaded fragments that will not contribute to the final color of a pixel may be indicated by discard information that is available within the fragment shading stage. The discard information may be used to discard or remove the shaded fragments that do not contribute to the final color of a pixel before those shaded fragments are transmitted from the fragment shading stage to one or more downstream processing stages of the processing pipeline.

Figure 1:
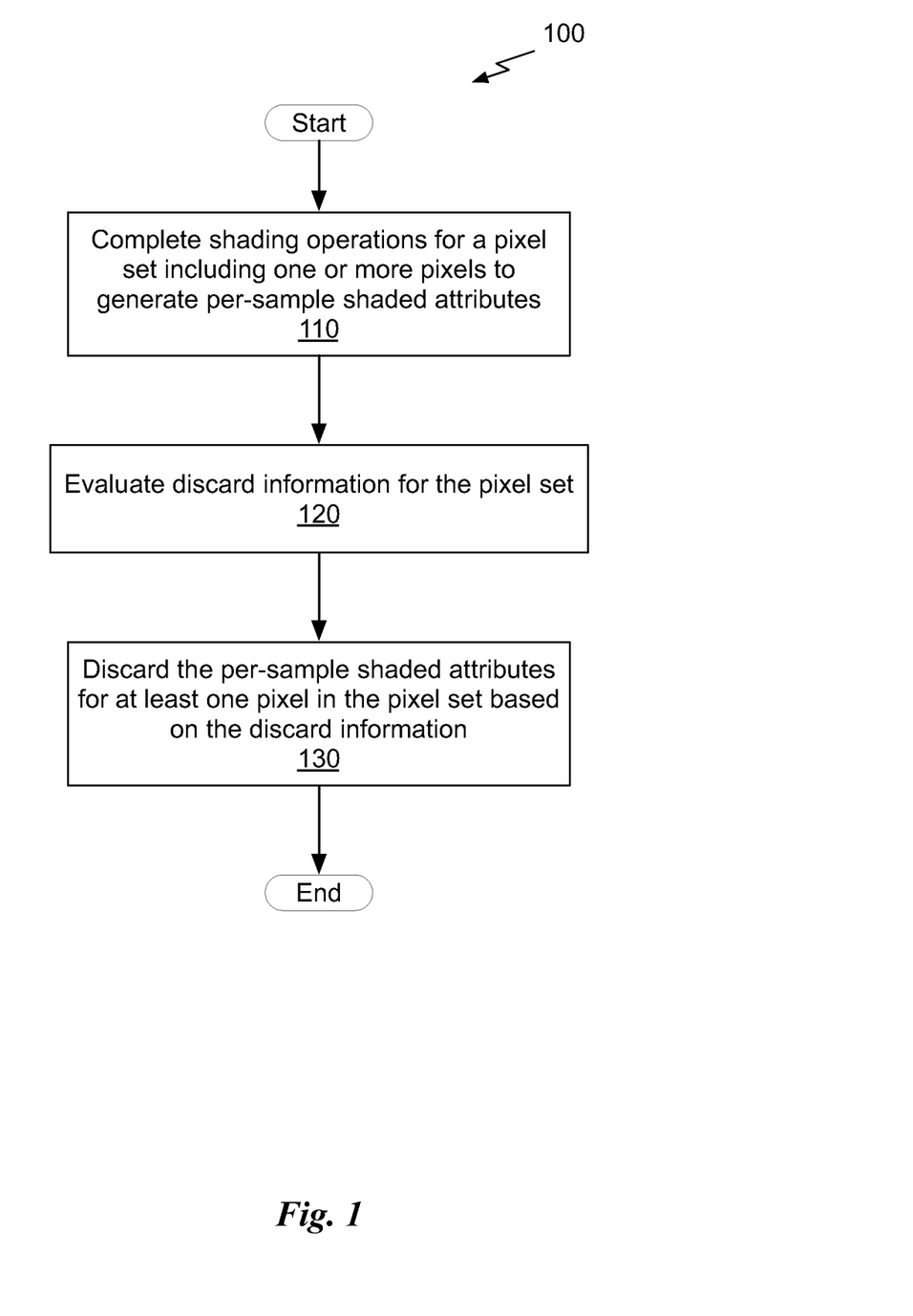
FIG. 1 illustrates a flowchart of a method for discarding per-sample shaded attributes for pixels, in accordance with one embodiment.

FIG. 1 illustrates a flowchart of a method 100 for discarding pixel samples, in accordance with one embodiment. At step 110, shading operations for a pixel set including one or more pixels to generate per-sample shaded attributes are completed according to a shader program executed by a processing pipeline. In the context of the present description, the processing pipeline may be a graphics processing pipeline that is implemented by a graphics processor or a general purpose processor, either of which is configured to execute instructions of the shader program.

At step 120, discard information for the pixel set is evaluated. In the context of the present description, discard information may include a rasterized coverage mask that is modified during fragment shading operations, a shader mask that is generated during fragment shader operations to indicate whether pixels or samples should be discarded, or a kill mask that is generated in response to execution of a shader program instruction to cause an entire set of pixels or one or more pixels to be discarded.

At step 130, per-sample shaded attributes for at least one pixel in the pixel set are discarded based on the evaluated discard information. In the context of the present description, the per-sample shaded attributes may be one or more of color, depth, texture coordinates, and the like. A surface equation corresponding to a graphics primitive such as a triangle or high-order surface may be evaluated at a sample location to generate an attribute for one or more samples of each pixel.

More illustrative information will now be set forth regarding various optional architectures and features with which the foregoing framework may or may not be implemented, per the desires of the user. It should be strongly noted that the following information is set forth for illustrative purposes and should not be construed as limiting in any manner.

Any of the following features may be optionally incorporated with or without the exclusion of other features described.

Figure 2:
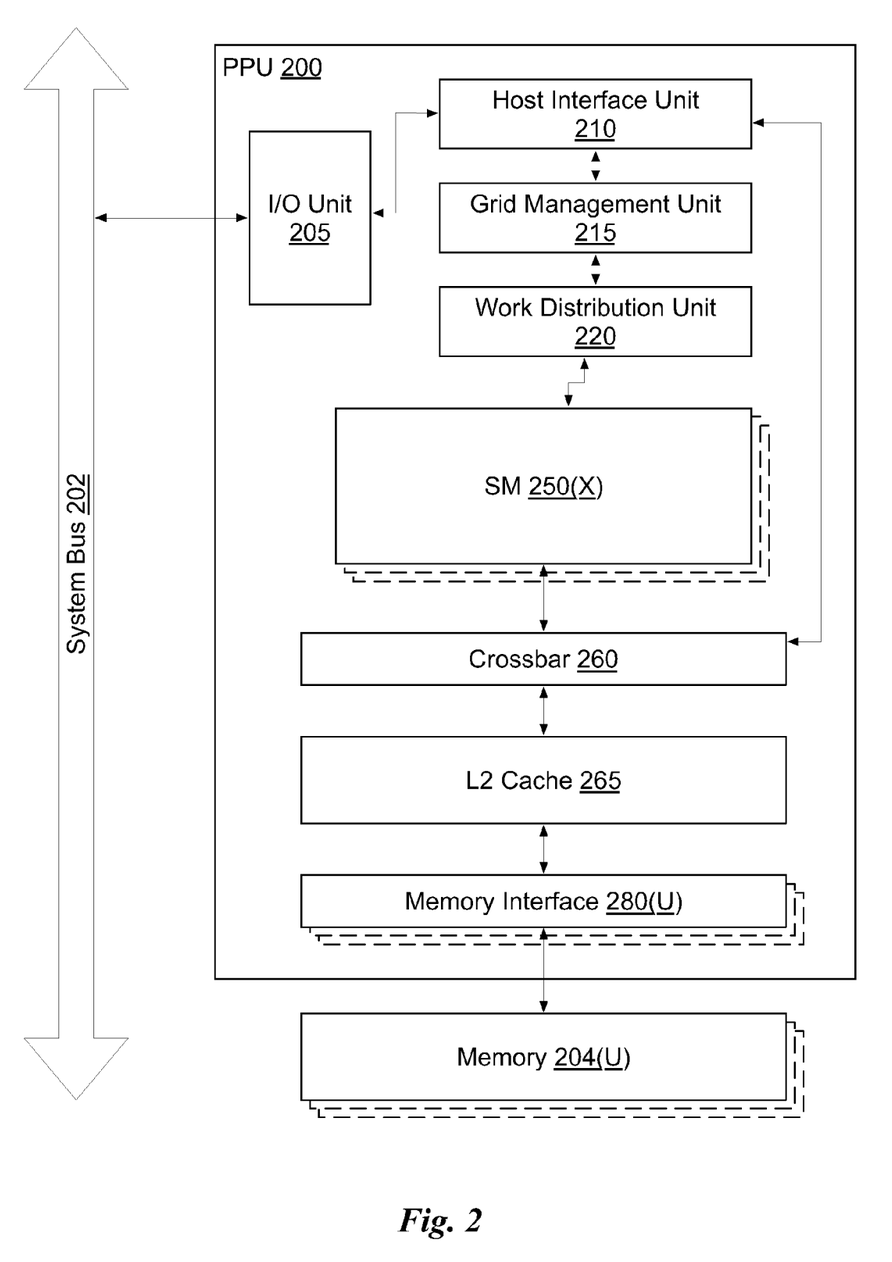
FIG. 2 illustrates a parallel processing unit (PPU), according to one embodiment.

FIG. 2 illustrates a parallel processing unit (PPU) 200, according to one embodiment. While a parallel processor is provided herein as an example of the PPU 200, it should be strongly noted that such processor is set forth for illustrative purposes only, and any processor may be employed to supplement and/or substitute for the same. In one embodiment, the PPU 200 is configured to execute a plurality of threads concurrently in two or more streaming multi-processors (SMs) 250. A thread (i.e., a thread of execution) is an instantiation of a set of instructions executing within a particular SM 250. Each SM 250, described below in more detail in conjunction with FIG. 3, may include, but is not limited to, one or more processing cores, one or more load/store units (LSUs), a level-one (L1) cache, shared memory, and the like.

In one embodiment, the PPU 200 includes an input/output (I/O) unit 205 configured to transmit and receive communications (i.e., commands, data, etc.) from a central processing unit (CPU) (not shown) over the system bus 202. The I/O unit 205 may implement a Peripheral Component Interconnect Express (PCIe) interface for communications over a PCIe bus. In alternative embodiments, the I/O unit 205 may implement other types of well-known bus interfaces.

The PPU 200 also includes a host interface unit 210 that decodes the commands and transmits the commands to the grid management unit 215 or other units of the PPU 200 (e.g., memory interface 280) as the commands may specify. The host interface unit 210 is configured to route communications between and among the various logical units of the PPU 200.

In one embodiment, a program encoded as a command stream is written to a buffer by the CPU. The buffer is a region in memory, e.g., memory 204 or system memory, that is accessible (i.e., read/write) by both the CPU and the PPU 200. The CPU writes the command stream to the buffer and then transmits a pointer to the start of the command stream to the PPU 200. The host interface unit 210 provides the grid management unit (GMU) 215 with pointers to one or more streams. The GMU 215 selects one or more streams and is configured to organize the selected streams as a pool of pending grids. The pool of pending grids may include new grids that have not yet been selected for execution and grids that have been partially executed and have been suspended.

A work distribution unit 220 that is coupled between the GMU 215 and the SMs 250 manages a pool of active grids, selecting and dispatching active grids for execution by the SMs 250. Pending grids are transferred to the active grid pool by the GMU 215 when a pending grid is eligible to execute, i.e. has no unresolved data dependencies. An active grid is transferred to the pending pool when execution of the active grid is blocked by a dependency. When execution of a grid is completed, the grid is removed from the active grid pool by the work distribution unit 220. In addition to receiving grids from the host interface unit 210 and the work distribution unit 220, the GMU 215 also receives grids that are dynamically generated by the SMs 250 during execution of a grid. These dynamically generated grids join the other pending grids in the pending grid pool.

In one embodiment, the CPU executes a driver kernel that implements an application programming interface (API) that enables one or more applications executing on the CPU to schedule operations for execution on the PPU 200. An application may include instructions (i.e., API calls) that cause the driver kernel to generate one or more grids for execution. In one embodiment, the PPU 200 implements a SIMD (Single-Instruction, Multiple-Data) architecture where each thread block (i.e., warp) in a grid is concurrently executed on a different data set by different threads in the thread block. The driver kernel defines thread blocks that are comprised of k related threads, such that threads in the same thread block may exchange data through shared memory. In one embodiment, a thread block comprises 32 related threads and a grid is an array of one or more thread blocks that execute the same stream and the different thread blocks may exchange data through global memory.

In one embodiment, the PPU 200 comprises X SMs 250(X). For example, the PPU 200 may include 15 distinct SMs 250. Each SM 250 is multi-threaded and configured to execute a plurality of threads (e.g., 32 threads) from a particular thread block concurrently. Each of the SMs 250 is connected to a level-two (L2) cache 265 via a crossbar 260 (or other type of interconnect network). The L2 cache 265 is connected to one or more memory interfaces 280. Memory interfaces 280 implement 16, 32, 64, 128-bit data buses, or the like, for high-speed data transfer. In one embodiment, the PPU 200 comprises U memory interfaces 280(U), where each memory interface 280(U) is connected to a corresponding memory device 204(U). For example, PPU 200 may be connected to up to 6 memory devices 204, such as graphics double-data-rate, version 5, synchronous dynamic random access memory (GDDR5 SDRAM).

In one embodiment, the PPU 200 implements a multi-level memory hierarchy. The memory 204 is located off-chip in SDRAM coupled to the PPU 200. Data from the memory 204 may be fetched and stored in the L2 cache 265, which is located on-chip and is shared between the various SMs 250. In one embodiment, each of the SMs 250 also implements an L1 cache. The L1 cache is private memory that is dedicated to a particular SM 250. Each of the L1 caches is coupled to the shared L2 cache 265. Data from the L2 cache 265 may be fetched and stored in each of the L1 caches for processing in the functional units of the SMs 250.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. Attributes may include one of more of position, color, surface normal vector, texture coordinates, etc. The PPU 200 can be configured to process the graphics primitives to generate a frame buffer (i.e., pixel data for each of the pixels of the display). The driver kernel implements a graphics processing pipeline, such as the graphics processing pipeline defined by the OpenGL API.

An application writes model data for a scene (i.e., a collection of vertices and attributes) to memory. The model data defines each of the objects that may be visible on a display. The application then makes an API call to the driver kernel that requests the model data to be rendered and displayed. The driver kernel reads the model data and writes commands to the buffer to perform one or more operations to process the model data. The commands may encode different shader programs including one or more of a vertex shader, hull shader, geometry shader, pixel shader, etc. For example, the GMU 215 may configure one or more SMs 250 to execute a vertex shader program that processes a number of vertices defined by the model data. In one embodiment, the GMU 215 may configure different SMs 250 to execute different shader programs concurrently. For example, a first subset of SMs 250 may be configured to execute a vertex shader program while a second subset of SMs 250 may be configured to execute a pixel shader program. The first subset of SMs 250 processes vertex data to produce processed vertex data and writes the processed vertex data to the L2 cache 265 and/or the memory 204. After the processed vertex data is rasterized (i.e., transformed from three-dimensional data into two-dimensional data in screen space) to produce fragment data, the second subset of SMs 250 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 3:
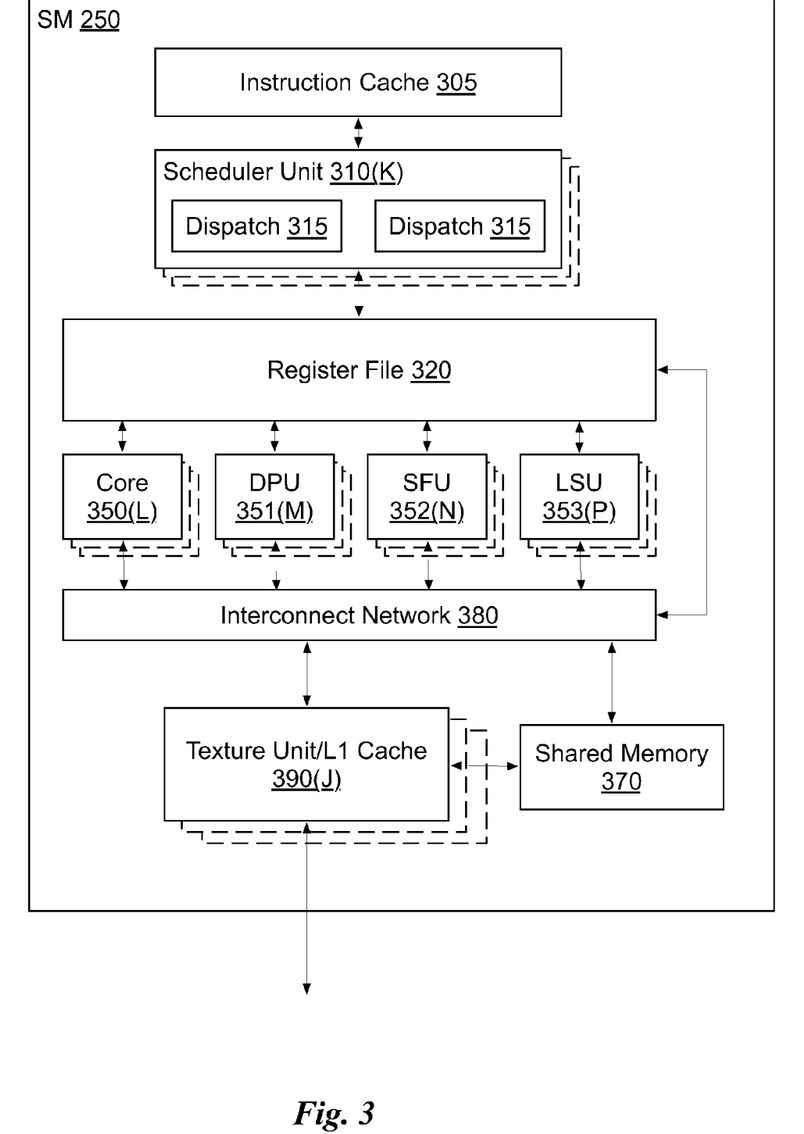
FIG. 3 illustrates the streaming multi-processor of FIG. 2, according to one embodiment.

FIG. 3 illustrates the streaming multi-processor 250 of FIG. 2, according to one embodiment. As shown in FIG. 3, the SM 250 includes an instruction cache 305, one or more scheduler units 310, a register file 320, one or more processing cores 350, one or more double precision units (DPUs) 351, one or more special function units (SFUs) 352, one or more load/store units (LSUs) 353, an interconnect network 380, a shared memory 370, and one or more texture unit/L1 caches 390.

As described above, the work distribution unit 220 dispatches active grids for execution on one or more SMs 250 of the PPU 200. The scheduler unit 310 receives the grids from the work distribution unit 220 and manages instruction scheduling for one or more thread blocks of each active grid. The scheduler unit 310 schedules threads for execution in groups of parallel threads, where each group is called a warp. In one embodiment, each warp includes 32 threads. The scheduler unit 310 may manage a plurality of different thread blocks, allocating the thread blocks to warps for execution and then scheduling instructions from the plurality of different warps on the various functional units (i.e., cores 350, DPUs 351, SFUs 352, and LSUs 353) during each clock cycle.

In one embodiment, each scheduler unit 310 includes one or more instruction dispatch units 315. Each dispatch unit 315 is configured to transmit instructions to one or more of the functional units. In the embodiment shown in FIG. 3, the scheduler unit 310 includes two dispatch units 315 that enable two different instructions from the same warp to be dispatched during each clock cycle. In alternative embodiments, each scheduler unit 310 may include a single dispatch unit 315 or additional dispatch units 315.

Each SM 250 includes a register file 320 that provides a set of registers for the functional units of the SM 250. In one embodiment, the register file 320 is divided between each of the functional units such that each functional unit is allocated a dedicated portion of the register file 320. In another embodiment, the register file 320 is divided between the different warps being executed by the SM 250. The register file 320 provides temporary storage for operands connected to the data paths of the functional units.

Each SM 250 comprises L processing cores 350. In one embodiment, the SM 250 includes a large number (e.g., 192, etc.) of distinct processing cores 350. Each core 350 is a fully-pipelined, single-precision processing unit that includes a floating point arithmetic logic unit and an integer arithmetic logic unit. In one embodiment, the floating point arithmetic logic units implement the IEEE 754-2008 standard for floating point arithmetic. Each SM 250 also comprises M DPUs 351 that implement double-precision floating point arithmetic, N SFUs 352 that perform special functions (e.g., copy rectangle, pixel blending operations, and the like), and P LSUs 353 that implement load and store operations between the shared memory 370 and the register file 320 via the texture unit/L1 caches 390 and the interconnect network 380. The J texture unit/L1 caches 390 are coupled between the interconnect network 380 and the shared memory 370 and are also coupled to the crossbar 260. In one embodiment, the SM 250 includes 64 DPUs 351, 32 SFUs 352, and 32 LSUs 353. In another embodiment, the L1 cache is not included within the texture unit and is instead included with the shared memory 370 with a separate direct connection to the crossbar 260.

Each SM 250 includes an interconnect network 380 that connects each of the functional units to the register file 320 and to the shared memory 370 through the interconnect network 380. In one embodiment, the interconnect network 380 is a crossbar that can be configured to connect any of the functional units to any of the registers in the register file 320, to any of the J texture unit/L1 caches 390, or the memory locations in shared memory 370.

In one embodiment, the SM 250 is implemented within a GPU. In such an embodiment, the SM 250 comprises texture unit/L1 caches 390. The texture unit/L1 caches 390 are configured to access texture maps (i.e., a 2D array of texels) from the memory 204 and sample the texture maps to produce sampled texture values for use in shader programs. The texture unit/L1 caches 390 implement texture operations such as anti-aliasing operations using mip-maps (i.e., texture maps of varying levels of detail). In one embodiment, the SM 250 includes 16 texture unit/L1 caches 390. As described further herein, the texture unit/L1 caches 390 are also configured to receive load and store requests from the LSUs 353 and to coalesce the texture accesses and the load and store requests to generate coalesced memory operations that are output to a memory system that includes the shared memory 370. The memory system may also include the L2 cache 265, memory 204, and a system memory (not shown).

The PPU 200 described above may be configured to perform highly parallel computations much faster than conventional CPUs. Parallel computing has advantages in graphics processing, data compression, biometrics, stream processing algorithms, and the like.

Figure 4:
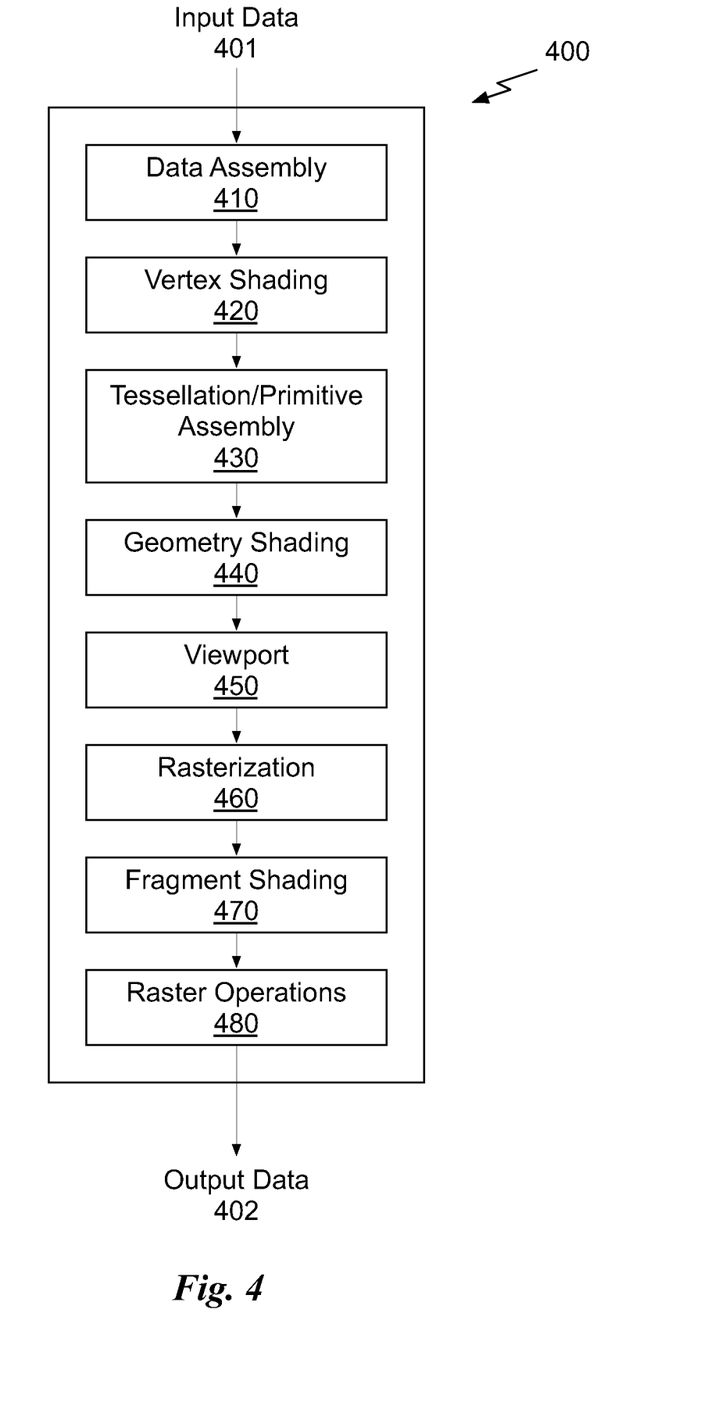
FIG. 4 is a conceptual diagram of a graphics processing pipeline implemented by the PPU of FIG. 2, in accordance with one embodiment.

FIG. 4 is a conceptual diagram of a graphics processing pipeline 400 implemented by the PPU 200 of FIG. 2, in accordance with one embodiment. The graphics processing pipeline 400 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 400 receives input data 401 that is transmitted from one stage to the next stage of the graphics processing pipeline 400 to generate output data 402. In one embodiment, the graphics processing pipeline 400 may represent a graphics processing pipeline defined by the OpenGL® API or by DirectX 11® by MICROSOFT.

As shown in FIG. 4, the graphics processing pipeline 400 comprises a pipeline architecture that includes a number of stages. The stages include, but are not limited to, a data assembly stage 410, a vertex shading stage 420, a tessellation/primitive assembly stage 430, a geometry shading stage 440, a viewport transform stage 450, a rasterization stage 460, a fragment shading stage 470, and a raster operations stage 480. In one embodiment, the input data 401 comprises commands that configure the processing units to implement the stages of the graphics processing pipeline 400 and process high-order geometric primitives (e.g., patches) and simpler geometric primitives (e.g., points, lines, triangles, quads, triangle strips or fans, etc.) to be processed by the stages. The output data 402 may comprise pixel data (i.e., color data) that is written into a frame buffer or other type of surface data structure in a memory. The SMs 250 may be configured by shader program instructions to function as one or more shading stages (e.g., vertex, hull, domain, geometry, and pixel shading stages) and write pixel data to the memory 204.

The data assembly stage 410 receives the input data 401 that specifies vertex data for high-order geometry. The data assembly stage 410 collects the vertex data defining the high-order graphics geometry in a temporary storage or queue, such as by receiving a command from the host processor that includes a pointer to a buffer in memory and reading the vertex data from the buffer. In one embodiment, a memory system may include one or more of the memory 204, the L2 cache 265, and the texture unit/L1 cache 390. The vertex data is then transmitted to the vertex shading stage 420 for processing.

The vertex shading stage 420 processes vertex data by performing a set of operations (i.e., a vertex shader or a program) once for each of the vertices. Vertices may be, e.g., specified as a 4-coordinate vector associated with one or more vertex attributes. The vertex shading stage 420 may manipulate properties such as position, color, texture coordinates, and the like. In other words, the vertex shading stage 420 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 420 generates transformed vertex data that is transmitted to the tessellation/primitive assembly stage 430.

The tessellation/primitive assembly stage 430 collects vertices output by the vertex shading stage 420 and tessellates patches represented by the vertices and control points into geometric primitives. In one embodiment, the tessellation/primitive assembly stage 430 groups the vertices into geometric primitives for processing by the geometry shading stage 440. For example, the tessellation/primitive assembly stage 430 may be configured to group every three consecutive vertices as a geometric primitive (i.e., a triangle) for transmission to the geometry shading stage 440. In some embodiments, specific vertices may be reused for consecutive geometric primitives (e.g., two consecutive triangles in a triangle strip may share two vertices). The primitive assembly stage 430 transmits geometric primitives (i.e., a collection of associated vertices) to the geometry shading stage 440.

The geometry shading stage 440 processes geometric primitives by performing a set of operations (i.e., a geometry shader or program) on the geometric primitives. Geometry shading operations may generate one or more geometric primitives from each geometric primitive. In other words, the geometry shading stage 440 may subdivide each geometric primitive into a finer mesh of two or more geometric primitives for processing by the rest of the graphics processing pipeline 400. The geometry shading stage 440 transmits geometric primitives to the viewport stage 450.

The viewport stage 450 performs a viewport transform, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on depth of the viewing frustum. All potentially visible geometric primitives are then transmitted to the rasterization stage 460.

The rasterization stage 460 converts the 3D geometric primitives into 2D fragments. The rasterization stage 460 may be configured to utilize the vertices of the geometric primitives to setup a set of surface equations from which various attributes can be interpolated. In one embodiment, the surface equations are plane equations in the form $Ax+By+C$, where x and y are sample locations and A, B, and C are plane equation parameters. In other embodiments, a surface equation specifies a high-order surface such as a patch. The rasterization stage 460 may also compute a coverage mask for a plurality of pixels that indicates whether one or more sample locations for the plurality of pixels intersect the geometric primitive.

The rasterization stage 460 may be configured to perform early z-testing based on per-vertex depth values to remove geometric primitives that will not be visible. The rasterization stage 460 transmits fragment data including the coverage masks and interpolated per-vertex attributes to the fragment shading stage 470.

The fragment shading stage 470 processes fragment data by performing a set of operations (i.e., a fragment shader or a program) on each of the fragments. The fragment shading stage 470 may generate shaded fragment data (i.e., shaded attributes such as color values) for the fragment such as by performing lighting operations or sampling texture maps using interpolated texture coordinates for the fragment. The shaded fragment data may be per-sample shaded attributes where one or more samples within a pixel share the same computed shaded attribute value or where a shaded attribute value is computed for each sample location within a pixel. The fragment shading stage 470 generates per-sample shaded fragment data that is transmitted to the raster operations stage 480.

The raster operations stage 480 may perform various operations on the shaded fragment data such as performing alpha tests, Z-test, stencil tests, and blending the shaded fragment data with other pixel data corresponding to other fragments associated with the pixel. When the raster operations stage 480 has finished processing the shaded fragment data to produce pixel data (i.e., the output data 402), the pixel data may be written to a display surface (i.e., render target such as a frame buffer, a color buffer, Z-buffer, or the like). The raster operations stage 480 may perform per-sample z-testing so that visible fragment data is written to the frame buffer and obscured fragment data is not written to the frame buffer.

It will be appreciated that one or more additional stages may be included in the graphics processing pipeline 400 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 440). Other types of graphics processing pipelines are contemplated as being within the scope of the present disclosure. Furthermore, any of the stages of the graphics processing pipeline 400 may be implemented by one or more dedicated hardware units within a graphics processor such as PPU 200. Other stages of the graphics processing pipeline 400 may be implemented by programmable hardware units such as the SM 250 of the PPU 200.

Figure 5:
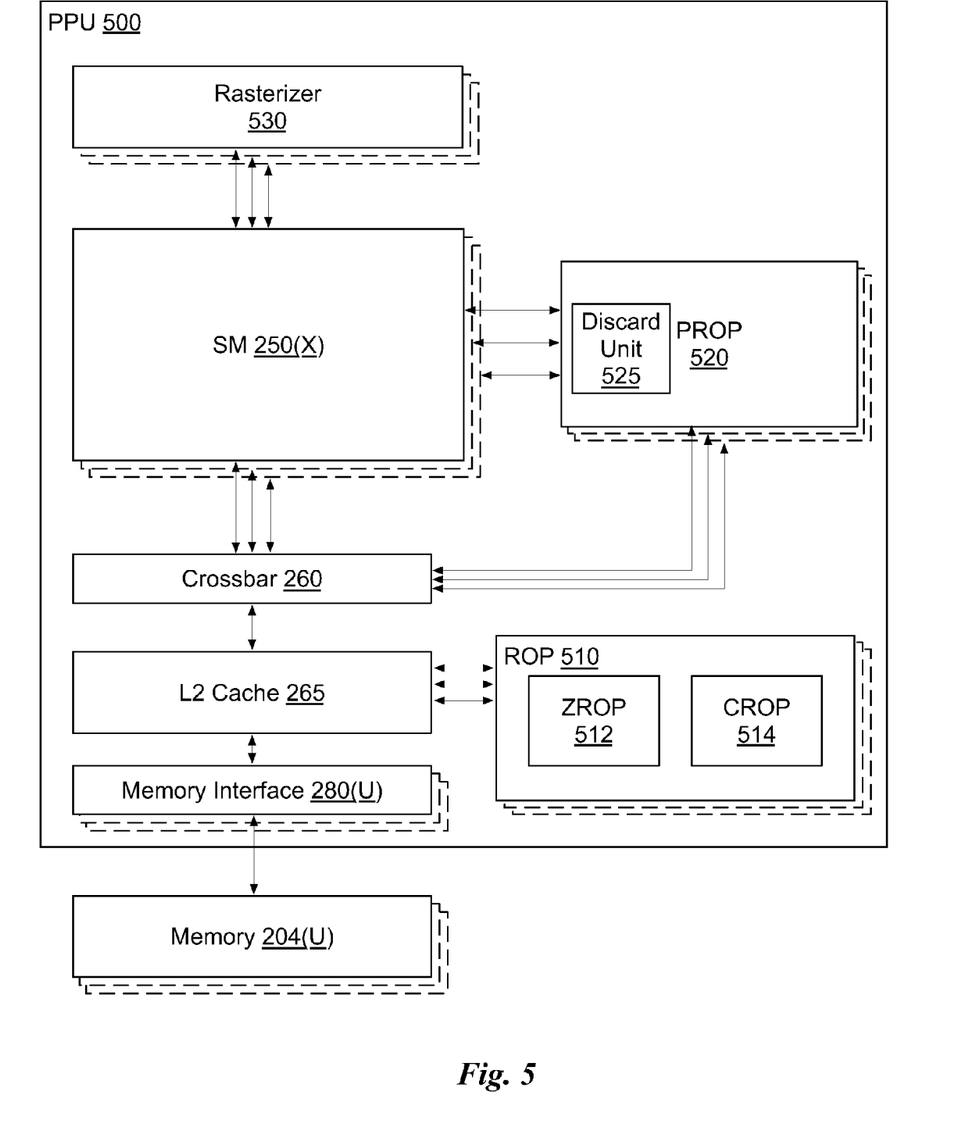
FIG. 5 illustrates a PPU that is configured to implement the graphics processing pipeline, in accordance with another embodiment.

FIG. 5 illustrates a PPU 500 that is configured to implement the graphics processing pipeline 400, in accordance with another embodiment. The PPU 500 is similar to PPU 200 of FIG. 2. The PPU 500 may include one or more dedicated hardware units for implementing various stages of the graphics processing pipeline 400 while other stages of the graphics processing pipeline 400 may be implemented within the programmable SMs 250. As shown in FIG. 5, the PPU 500 includes one or more raster operations units 510, one or more pre-raster operations (PROP) units 520, and one or more rasterizers 530. Each of these dedicated hardware units may be configured to implement at least a portion of the operations for a stage of the graphics processing pipeline 400, described above.

In one embodiment, the raster operations (ROP) units 510 include a z-raster operations (ZROP) engine 512 and a color-raster operations (CROP) engine 514. The ZROP engine 512 compares Z-values for pixel data to previously stored Z-values read for the corresponding sample locations, where the previously stored Z-values are read from a surface stored in the memory 204. The results from the ZROP engine 512 determine if the various pixel data for a fragment will be kept or discarded. More specifically, the ZROP engine 512 compares the Z-value of each sample location with the Z-value of a corresponding sample location stored in a depth map (i.e., Z-buffer surface). This process is known as Z-testing. If the current fragment passes Z-testing, then the ZROP engine 512 optionally writes the Z-value for the current fragment to the corresponding sample location in the depth map. If the current fragment does not pass Z-testing, then the pixel data may be discarded and the Z-value for the current fragment is not written to the depth map. The CROP engine 514 writes the color value for the current fragment to the frame buffer if the fragment passes the Z-testing.

The z-value attributes and color attributes may be stored in a sample-specific-compressed format, such as a plane-compressed format. Rather than storing an attribute value at each sample location, the plane equation coefficients are stored as surface parameters and a plane equation may be evaluated at a sample location using the plane equation coefficients for the attribute to reconstruct the attribute at the sample location. In another embodiment, the surface parameters correspond to a high-order surface and an equation specifying the high-order surface is evaluated at a sample location using the surface parameters for the attribute to reconstruct the attribute at the sample location.

In one embodiment, the number of ROP units 510 may be equal to the number of memory partitions 204, with each ROP unit 510 allocated to a particular memory partition 204. The ZROP unit 512 or the CROP unit 514 reads or writes values to the L2 cache 265. Then, the L2 cache 265 manages memory fetch requests from the memory 204 or the write-back of dirty data from the L2 cache 265 into the memory 204. Although not explicitly shown, the ROP units 510 may be coupled to the L2 Cache 265 as well as the SM 250 and the PROP units 520 via the crossbar 260.

The PROP units 520 manage the flow of pixel data between the ZROP engine 512, the CROP engine 514, and the SM 250. In one embodiment, the number of PROP units 520 matches the number of SMs 250, with each PROP unit 520 allocated to a particular SM 250. It will be appreciated that the number of PROP units 520 is not necessarily the same as the number of ROP units 510. Again, although not explicitly shown, the PROP units 520 may communicate with the ROP units 510 via the crossbar 260.

In addition to the ROP units 510 and the PROP units 520, the PPU 500 includes one or more rasterizers 530 coupled to the one or more SMs 250. In one embodiment, the number of rasterizers 530 equals the number of SMs 250. Each rasterizer 530 is a dedicated hardware unit configured to perform at least a portion of the operations of the rasterization stage 460 of the graphics processing pipeline 400, described above. For example, the rasterizer 530 may receive a geometric primitive from the viewport stage 450 and set up surface equations corresponding to the geometric primitive. Although not explicitly shown, the rasterizers 530 may be coupled to the crossbar 260 in order to communicate with other units of the PPU 500 such as the SMs 250 or a hardware unit configured to implement at least a portion of the operations of the viewport stage 450 of the graphics processing pipeline 400.

It will be appreciated that the rasterizers 530 implement anti-aliasing operations. For example, in order to calculate a rasterized coverage mask for a tile of pixels, the rasterizer 530 performs intersection tests that determine whether each sample location in the tile of pixels is intersected by a geometric primitive. A pixel tile may be an array of pixels in a digital image such as a 16×16 array of pixels, which would include, e.g., 16 pixel quads. The intersection tests indicate whether the sample locations are covered by the geometric primitive. The rasterized coverage information is passed down the graphics processing pipeline 400 to the fragment shading stage 470. If anti-aliasing techniques are implemented, then the intersection tests should be computed for each of the two or more sample locations within a pixel. Additional units within the PPU 500 may also implement anti-aliasing operations including the ZROP engine 512, CROP engine 514, and any SM 250 configured to execute a fragment shader.

The PROP 520 retrieves pixel data (e.g., per-sample shaded attributes and discard information) that is stored in the SM 250 for a pixel set. The pixel set may correspond to a pixel tile, the pixels processed by a warp, or a collection of two or more pixels. The shaded fragment data may be stored in the register file 320 or shared memory 370. Before retrieving the per-sample shaded attributes, a discard unit 525 included in the PROP 520 obtains the discard information that is also available in the SM 250. As previously explained, the discard information may include a rasterized coverage mask that is modified by the fragment shading stage 470 during fragment shading operations, a shader mask (shaderMask) that is generated by the fragment shading stage 470 during fragment shader operations to indicate whether pixels or samples should be discarded, or a kill mask (killMask) that is generated by the fragment shading stage 470 in response to execution of a shader program instruction to cause an entire set of pixels or one or more pixels to be discarded.

In one embodiment, the SM 250 that is configured as the fragment shading stage 470 receives a shader program instruction (e.g., discard instruction) that causes one or more pixels to be discarded by the discard unit 525. A driver in a host processor may generate a discard instruction into the shader program. When the discard instruction is received, execution of the shader program terminates, effectively killing one or more pixels being processed by the shader program. The discard instruction may specify that the entire pixel set should be discarded or that one or more pixels in the pixel set should be discarded. For example, the discard instruction may specify that the pixels processed by a warp should be discarded or the discard instruction may specify a mask that includes a bit for each pixel processed by a warp, such that the pixels may be individually discarded. TABLE 1 illustrates pseudo code including a discard instruction (KIL) that conditionally kills a pixel when screen, x<screen.y.

TABLE 1

```
!!FakeFP1.0
    MOVr o[COLR], {1, 1, 0, 1};
    ADDrc rc, f[wpos].x, -f[wpos].y;
    KIL LT;
    END;
```

The fragment shading stage 470 generates a killMask whet the discard instruction is executed.

The fragment shading stage 470 may modify the rasterized coverage mask generated by the rasterizer 530 when texture colorKey operations are performed by the texture unit/L1 cache 390. The texture unit/L1 cache 390 samples texture maps to produce sampled texture values that are filtered (e.g., point, bi-linear, tri-linear, anisotropic, etc.) to generate per-sample shaded attributes. A colorKey value is specified and when a per-sample attribute generated by the texture unit/L1 cache 390 matches the colorKey value, the rasterized coverage mask is updated to indicate that the sample corresponding to the color is not covered and should be discarded. When a shader mask function is enabled, the fragment shading stage 470 may generate a shader mask (i.e., shaderMask) or may modify the rasterized coverage mask to indicate that one or more samples should be discarded. TABLE 2 illustrates pseudo code for a shader program that discards every other sample in the rasterized coverage mask to produce a modified rasterized coverage mask that is stored in R4.

TABLE 2

```
!!SPA2.0 .THREAD_TYPE PIXEL
    #tram 0x7c = f[WPOS].w
    #var float4 oColor : $vout.COLOR : COL : 0 : 1
// output color in R0..R3
    #var uint oCoverage : $vout.COVERAGE : COVG : 0 : 1
// output covg in R4
    IPA.PASS R0, a[0x7c];
    MOV R1, R0;
    MOV R2, R0;
    MOV R3, R0
    MOV32I R4, 0x55555555;
    EXIT; END;
```

Figure 7:
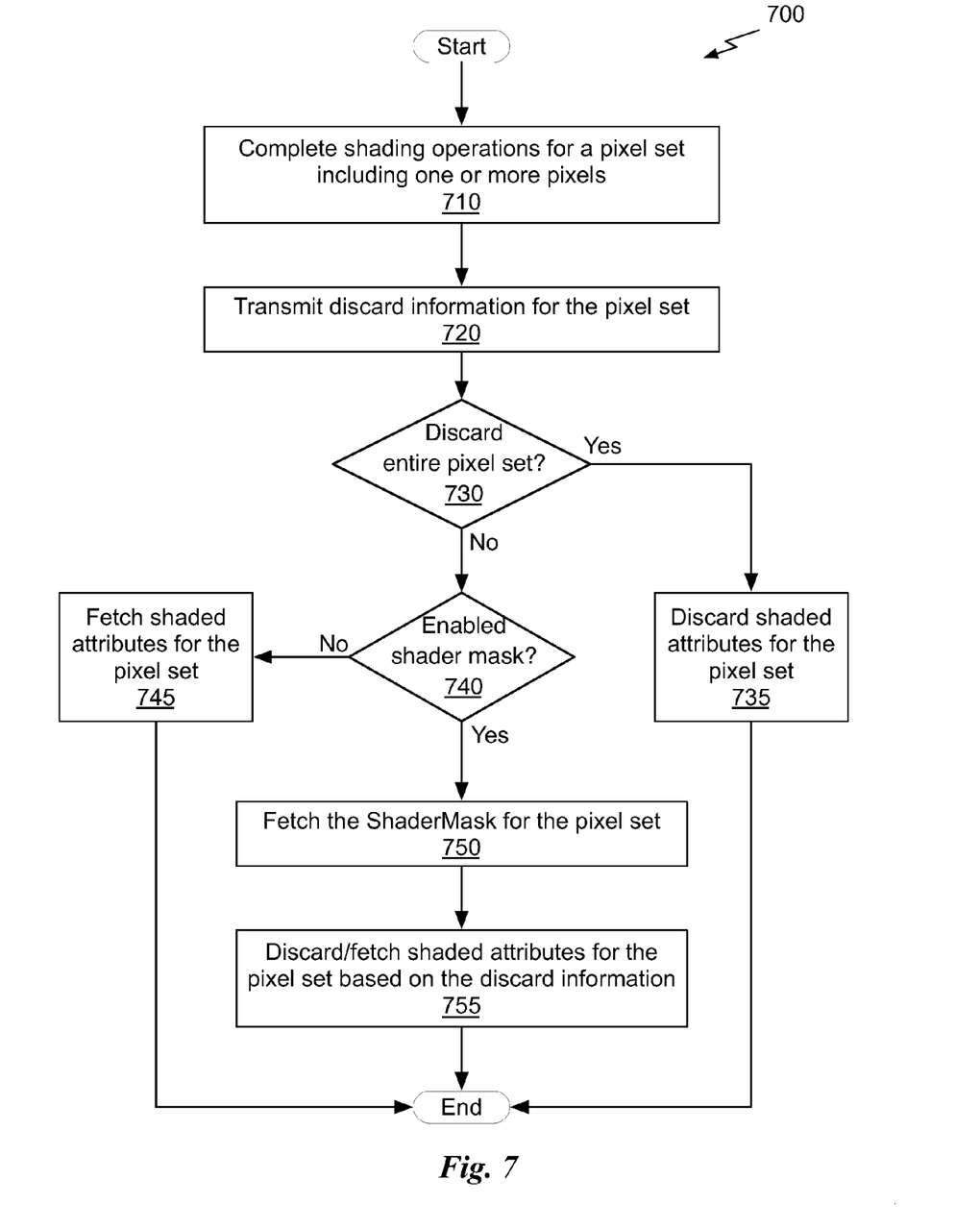
FIG. 7 illustrates another flowchart of a method for discarding per-sample shaded attributes for pixels, in accordance with one embodiment.

The discard unit 525 evaluates the discard information and, based on the evaluated discard information the discard unit 525 may retrieve per-sample shaded attributes for all samples in the pixel set, a portion of the samples in the pixel set, or none of the samples in the pixel set, as described in further detail in conjunction with FIG. 7. The per-sample shaded attributes that are not retrieved by the discard unit 525 based on the evaluated discard information are discarded and are not transmitted from the SM 250 to the PROP 520. Avoiding the unnecessary transmission reduces power and may also improve the processing throughput. The number of dock cycles needed to transfer the discard information and per-sample shaded attributes varies depending on the number of samples per pixel, attributes per sample, attribute size, and display render targets.

Figure 6A:
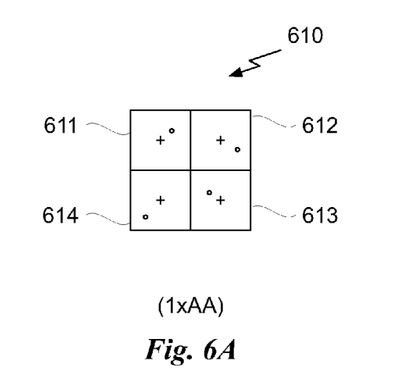
FIGS. 6A through 6E illustrate various anti-aliasing sample patterns, in accordance with one embodiment.

FIGS. 6A through 6E illustrate various anti-aliasing sample patterns, in accordance with one embodiment. As shown in FIG. 6A, a 1× anti-aliasing (1×AA) sample pattern may be defined for a pixel quad 610. The pixel quad 610 is a 2×2 array of pixels (611, 612, 613, and 614). In one embodiment, the sample pattern for the pixel quad 610 comprises each of the pixel centers (shown as cross-hairs in FIG. 6A). In other words, when the PPU 500 is configured to generate pixel data using 1×AA, a single sample location for each pixel corresponds to the pixel center. However, because the sample pattern is a regularly spaced array with one sample point per pixel, an image generated using 1×AA may exhibit aliasing artifacts. In another embodiment, the sample pattern for the pixel quad 610 may be jittered (i.e., randomly distributed throughout the pixels) in order to alleviate the aliasing artifacts. As shown in FIG. 6A, the jittered sample locations for each pixel may be shown by the small circles offset from each pixel's center. By moving the sampling locations so that the sampling locations are not located at the pixel centers, the resulting pixel data includes some amount of random noise, which alleviates the aliasing artifacts by some small amount.

Figure 6B:
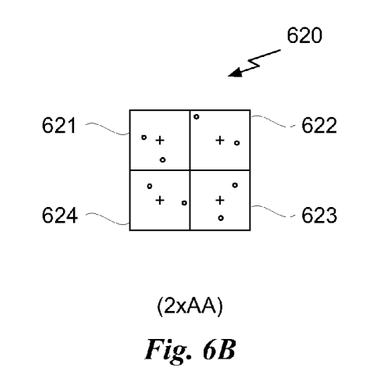

While jittering the sample locations alleviates the aliasing artifacts, rendering the image at a higher resolution and then down-sampling the high-resolution image to generate the resulting image data helps reduce aliasing artifacts even more. As shown in FIG. 6B, each pixel (621, 622, 623, and 624) in the pixel quad 620 includes two sample locations. Two sample locations per pixel corresponds to 2× anti-aliasing (2×AA). Again, the sample locations in the sample pattern for the pixel quad 620 may be distributed within the pixels. Typically, shaded attributes are computed for one sample location or at the center of each pixel, so even though the number of samples increases for 2×AA compared with 1×AA, the number of shaded attributes for each pixel does not increase. However, the number of bits in the rasterized coverage mask increases and the number of bits in the discard information may also increase.

Figure 6C:
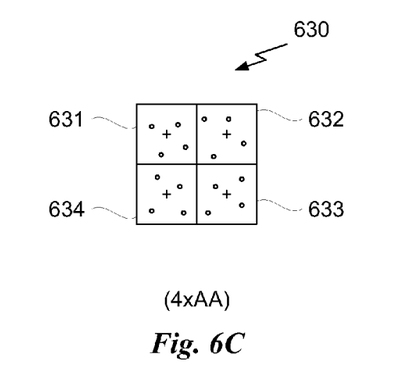

As shown in FIG. 6C, a pixel quad 630 may include pixels (631, 632, 633, and 634) that include four sample locations corresponding to 4× anti-aliasing (4×AA). A sample pattern defining sample locations that are distributed within less than four pixels or more than four pixels is contemplated as being within the scope of the present disclosure.

Figure 6D:
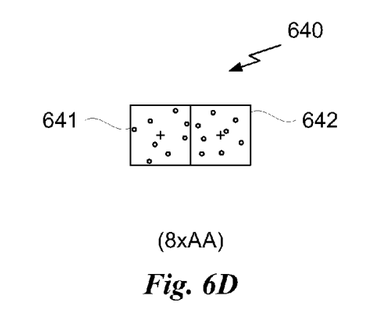
Figure 6E:
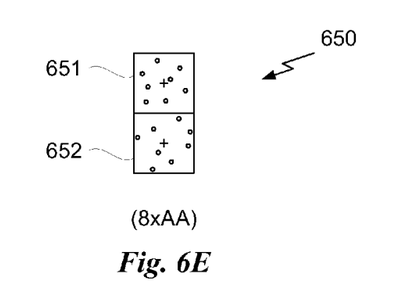

Some graphics hardware may be limited in the number of sample locations that are stored in hardware units. For example, some hardware units may have a limit of 16 sample locations per pixel quad. While this limitation enables 4×AA for a pixel quad, 8× anti-aliasing (8×AA) cannot be performed for a pixel quad because this configuration may require 32 sample locations. In such cases, two pixels can be processed substantially simultaneously in either a 1×2 array of pixels (FIG. 6D) or a 2×1 array of pixels (FIG. 6E). As shown in FIG. 6D, each pixel (641 and 642) in the pixel pair 640 includes eight sample locations. Similarly, as shown in FIG. 6E, each pixel (651 and 652) in the pixel pair 650 includes eight sample locations. Furthermore, with such limitations, each pixel pair 650 will have the same sample locations when implementing 16×AA. The number of pixels in the pixel set may correspond to a 2×1 array of pixels, a 1×2 array of pixels, a pixel quad, the number of pixels processed by a warp, or any other arrangement of pixels.

The number of bits in the rasterized coverage mask increases from one bit to eight bits as the number of samples per pixel increases for 1×AA to 8×AA. When the discard information is a killMask, a single bit may be used to indicate whether all pixels in a pixel set of two or more pixels should be discarded. In one embodiment, the number of bits in the killMask equals the number of pixels in the pixel set, so that each pixel in the pixel set can be separately controlled for discarding. The number of bits in the shaderMask may equal the number of pixels or the number of samples in the pixel set.

Per-sample shaded attributes that are retrieved by the discard unit 525 based on the discard information may include color and depth. While there is typically a single color value for each pixel, there may be a different depth value for each sample of each pixel. The number of bits used to represent each color may vary from 24 bits (e.g., 8 bits for each red, green, and blue component) or 32 bits (e.g., 8 bits for each red, green, blue, and alpha component) to 128 bits (e.g., 32 bits for each red, green, blue, and alpha component) or more. The amount of color shaded attribute data that is fetched by the discard unit 525 and transmitted from the SM 250 to the PROP 520 increases by as much as four times.

Furthermore, multiple color targets may also be specified, where each color target corresponds to a different frame buffer. Therefore, the per-sample shaded attributes, or at least the color values, for each pixel are fetched once for each color target. When eight different color targets are used, the amount of color shaded attribute data that is fetched by the discard unit 525 and transmitted from the SM 250 to the PROP 520 increases eight-fold.

In one embodiment, the per-sample shaded attributes for 8 pixels are transferred from the SM 250 to the PROP 520 each clock cycle when the sampling mode is N×AA and N≤8 and 4 pixels are transferred each clock cycle when N>8. Therefore, when the per-sample shaded attributes for an entire pixel set that includes 32 pixels is discarded and not transferred from the SM 250 to the PROP 520, and the clock cycles that would have been consumed to transfer the shaded attributes for 32 pixels may instead be used to transfer per-sample shaded attributes that are not discarded, saving 4 or more clock cycles. Additionally, the power consumption may be reduced when the per-sample shaded attributes for the 32 pixels are not processed by the PROP 520 and pass through one or more pipeline stages inside the PROP 520. Similarly, when the per-sample shaded attributes for four pixels in a pixel set that includes 32 pixels are discarded, the number of clock cycles needed to transfer the remaining per-sample shaded attributes is reduced from 4 to 3 when N>8. When two color targets are specified, the number of clock cycles needed to transfer the remaining per-sample shaded attributes is reduced from 8 to 6.

FIG. 7 illustrates another flowchart of a method for discarding per-sample shaded attributes for pixels, in accordance with one embodiment. Performing the method steps, in any order, is contemplated as being within the context of this disclosure. At step 710, shading operations for a pixel set including one or more pixels are completed according to a shader program executed by the fragment shading stage 470 of a processing pipeline to generate per-sample shaded attributes. In one embodiment, the processing pipeline may be the graphics processing pipeline 400 and the fragment shading stage 470 may be implemented by an SM that is configured to execute instructions of the shader program.

At step 720, discard information for the pixel set is transmitted from the fragment shading stage 470 to the raster operations stage 480. In one embodiment, the raster operations stage 480 is implemented by at least the PROP 520 and ROP 510. The discard unit 525 within the PROP 520 may be configured to fetch the discard information from the SM 250.

At step 730, the discard unit 525 determines if the discard information indicates that the entire pixel set should be discarded. In one embodiment, the discard information may include a killMask that is used by the discard unit 525 to determine whether the entire pixel set should be discarded. In one embodiment, the discard information may include a rasterized coverage mask that has been modified by a texture colorKey operation to indicate that the entire pixel set should be discarded. If, at step 730, the discard unit 525 determines that the discard information indicates the entire pixel set should be discarded, then at step 735, the discard unit 525 discards the per-sample shaded attributes computed for the pixel set during execution of the shader program and then terminates. The discard unit 525 discards the per-sample shaded attributes by not fetching the shaded attributes stored in the SM 250.

If, at step 730, the discard unit 525 determines that the discard information does not indicate that the entire pixel set should be discarded, then at step 740, the discard unit 525 determines if a shader mask is enabled. If the shader mask is not enabled, then at step 745, the discard unit 525 fetches the per-sample shaded attributes computed for the pixel set during execution of the shader program that are stored in the SM 250 and then terminates.

If, at step 740, the shader mask is enabled, then at step 750, the discard unit 525 fetches the shaderMask for the pixel set from the SM 250. At step 755, the discard unit 525 discards and/or fetches per-sample shaded attributes computed for the pixel set during execution of the shader program that are stored in the SM 250 based on the shader mask and then terminates.

Discarding per-sample shaded attributes so that the per-sample shaded attributes are not transmitted from the SM 250 to the PROP 520 reduces the number of clock cycles that are consumed to transmit data that will not contribute to the final color of a pixel. Discarding the per-sample shaded attributes also reduces the power consumed when the per-sample shaded attributes are transmitted to and pipelined through the PROP 520. Shading operations that may be performed to modify the rasterized coverage mask include the texture colorKey operations. A shaderMask and/or killMask may be generated during shading operations to indicate that a shaded fragment will not contribute to the final color of a pixel. The modified rasterized coverage mask, killMask, and/or shaderMask may be included as discard information that is available within the SM 250. The discard information may be used by the discard unit 525 to discard or remove the per-sample shaded attributes that do not contribute to the final color of a pixel before those per-sample shaded attributes are transmitted from the SM 250 to the PROP 520 and/or other downstream processing units.

Figure 8:
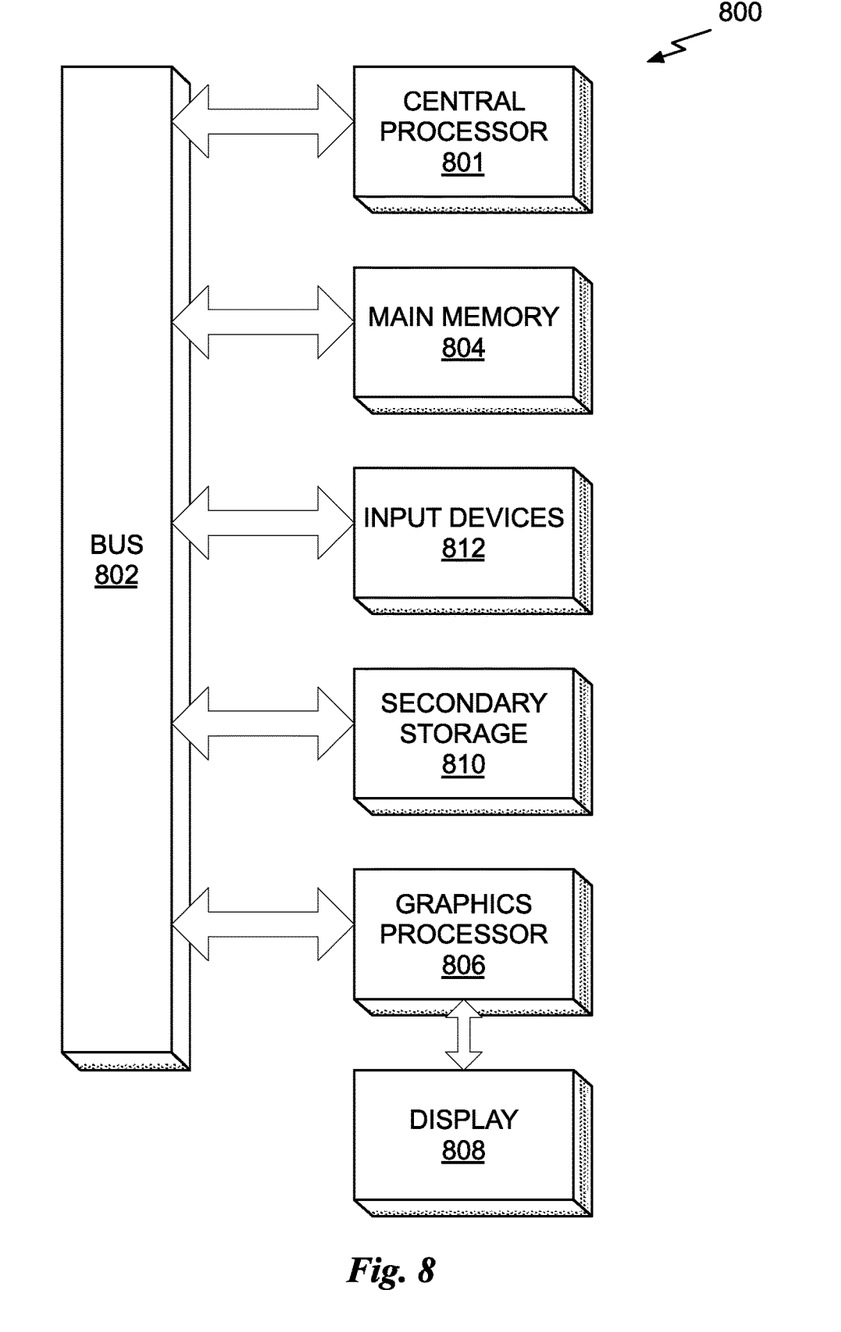
FIG. 8 illustrates an exemplary system in which the various architecture and/or functionality of the various previous embodiments may be implemented.

FIG. 8 illustrates an exemplary system 800 in which the various architecture and/or functionality of the various previous embodiments may be implemented. As shown, a system 800 is provided including at least one central processor 801 that is connected to a communication bus 802. The communication bus 802 may be implemented using any suitable protocol, such as Pet (Peripheral Component Interconnect), PCI-Ex press, AGP (Accelerated Graphics Port), HyperTransport, or any other bus or point-to-point communication protocol(s). The system 800 also includes a main memory 804. Control logic (software) and data are stored in the main memory 804 which may take the form of random access memory (RAM).

The system 800 also includes input devices 812, a graphics processor 806, and a display 808, i.e. a conventional CRT (cathode ray tube), LCD (liquid crystal display), LED (light emitting diode), plasma display or the like. User input may be received from the input devices 812, e.g., keyboard, mouse, touchpad, microphone, and the like. In one embodiment, the graphics processor 806 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 800 may also include a secondary storage 810. The secondary storage 810 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 804 and/or the secondary storage 810. Such computer programs, when executed, enable the system 800 to perform various functions. The memory 804, the storage 810, and/or any other storage are possible examples of computer-readable media.

In one embodiment, the architecture and/or functionality of the various previous figures may be implemented in the context of the central processor 801, the graphics processor 806, an integrated circuit (not shown) that is capable of at least a portion of the capabilities of both the central processor 801 and the graphics processor 806, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 800 may take the form of a desktop computer, laptop computer, server, workstation, game consoles, embedded system, and/or any other type of logic. Still yet, the system 800 may take the form of various other devices including, but not limited to a personal digital assistant (PDA) device, a mobile phone device, a television, etc.

Further, while not shown, the system 800 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
performing shading operations for a pixel set including one or more pixels to generate per-sample shaded attributes according to a shader program executed by a processing pipeline;
after generating the per-sample shaded attributes and before z-testing the per-sample shaded attributes, evaluating discard information for the pixel set that is generated during the performance of the shading operations; and
before z-testing the per-sample shaded attributes, discarding one or more per-sample shaded attributes for at least one pixel in the pixel set based on the evaluated discard information.

2. The method of claim 1, wherein the discard information indicates that all samples in the pixel set should be discarded.

3. The method of claim 1, wherein the discard information comprises a kill mask that is generated for the pixel set by the processing pipeline when a discard instruction is executed.

4. The method of claim 3, wherein the kill mask includes a bit for each pixel in the pixel set.

5. The method of claim 1, wherein the discard information comprises a shader mask that is computed for the pixel set by the processing pipeline during the shading operations.

6. The method of claim 5, wherein the shader mask includes a bit for each sample in the pixel set.

7. The method of claim 5, wherein the discard information comprises results of a texture colorKey operation.

8. The method of claim 7, wherein the at least one pixel is discarded immediately after a filtered texture value is generated for each sample of the at least one pixel.

9. The method of claim 5, wherein evaluating the discard information comprises:

determining that generation of the shader mask is enabled for the shader program; and fetching the shader mask.

10. The method of claim 1, wherein each pixel in the pixel set includes at least two samples.

11. The method of claim 1, further comprising fetching the per-sample shaded attributes for any pixels in the pixel set that are not discarded based on the evaluated discard information.

12. A system comprising:
a processing pipeline that is configured to:
perform shading operations for a pixel set including one or more pixels to generate per-sample shaded attributes according to a shader program executed by a processing pipeline;
evaluate discard information for the pixel set after the per-sample shaded attributes are generated and before z-testing the per-sample shaded attributes, where the discard information is generated during the performance of the shading operations; and
before z-testing the per-sample shaded attributes, discard one or more per-sample shaded attributes for at least one pixel in the pixel set based on the evaluated discard information.

13. The system of claim 12, wherein the discard information indicates that all samples in the pixel set should be discarded.

14. The system of claim 12, wherein the discard information comprises a kill mask that is computed for the pixel set by the processing pipeline when a discard instruction is executed.

15. The system of claim 14, wherein the kill mask includes a bit for each pixel in the pixel set.

16. The system of claim 12, wherein the discard information comprises a shader mask that is computed for the pixel set by the processing pipeline during the shading operations.

17. The system of claim 16, wherein the shader mask includes a bit for each sample in the pixel set.

18. The system of claim 16, wherein the discard information comprises results of a texture colorKey operation.

19. The system of claim 18, wherein the at least one pixel is discarded immediately after a filtered texture value is generated for each sample of the at least one pixel.

20. A non-transitory computer-readable storage medium storing instructions that, when executed by a processor, causes the processor to perform steps comprising:
performing shading operations for a pixel set including one or more pixels to generate per-sample shaded attributes according to a shader program executed by a processing pipeline;
after generating the per-sample shaded attributes and before z-testing the per-sample shaded attributes, evaluating discard information for the pixel set that is generated during the performance of the shading operations; and
before z-testing the per-sample shaded attributes, discarding one or more per-sample shaded attributes for at least one pixel in the pixel set based on the evaluated discard information.

* * * * *